(12) United States Patent
Zimmermann et al.

(10) Patent No.: US 6,350,049 B1
(45) Date of Patent: Feb. 26, 2002

(54) LIGHTING ARRANGEMENT FOR MOTOR VEHICLES

(75) Inventors: Werner Zimmermann, Ottenbach; Doris Gampp, Esslingen, both of (DE)

(73) Assignee: Reitter & Schefenacker GmbH & Co. KG (DE)

( * ) Notice: Subject to any disclaimer, the term of this patent is extended or adjusted under 35 U.S.C. 154(b) by 0 days.

(21) Appl. No.: 09/510,718

(22) Filed: Feb. 22, 2000

(30) Foreign Application Priority Data

Feb. 22, 1999 (DE) ...................................... 299 03 080 U (51) Int. Cl.⁷ .......................................... F21W 101/02
(52) U.S. Cl. ........................................ 362/496; 362/542
(58) Field of Search ................................. 362/540, 541, 362/542, 488, 496, 252, 253, 234; 340/472

(56) References Cited

U.S. PATENT DOCUMENTS

| | | | | |
|---|---|---|---|---|
| 2,054,919 A | * | 9/1936 | Anibal | 362/496 X |
| 2,772,406 A | * | 11/1956 | Juergens | 362/496 |
| 2,891,235 A | * | 6/1959 | Halpert | 362/496 X |
| 2,905,925 A | * | 9/1959 | Whiteneck | 362/496 X |
| 3,582,639 A | * | 6/1971 | Chamberlain | 362/496 X |
| 4,054,789 A | | 10/1977 | Romanelli | 362/80 |
| 4,353,111 A | * | 10/1982 | Gallitzendörfer et al. | 362/496 |
| 5,711,593 A | * | 1/1998 | Gold | 362/496 |

FOREIGN PATENT DOCUMENTS

| | | |
|---|---|---|
| DE | 29 48 524 A1 | 6/1981 |
| DE | 41 01 418 A1 | 9/1991 |
| DE | 43 30 327 A1 | 4/1994 |
| DE | 197 06 043 A1 | 6/1998 |
| EP | 0 385 229 A1 | 9/1990 |
| FR | 2 715 908 | 8/1995 |

* cited by examiner

*Primary Examiner*—Laura K. Tso
(74) *Attorney, Agent, or Firm*—R. W. Becker & Associates; R. W. Becker (57) ABSTRACT

A lighting arrangement for motor vehicles is provided. The lighting arrangement has at least one rear lighting arrangement that is provided on the trunk lid or hatchback of the vehicle. The lighting arrangement is embodied in such a way that light is radiated toward the rear when the trunk lid or hatchback is opened.

16 Claims, 9 Drawing Sheets

LIGHTING ARRANGEMENT FOR MOTOR VEHICLES

BACKGROUND OF THE INVENTION

The present invention relates to a lighting arrangement for motor vehicles especially passenger vehicles, that have a trunk lid or a hatchback and are provided with rear lighting arrangements. Known lighting arrangements of this type have rear lighting arrangements that are disposed in the rear portion of the vehicle, and in particular are disposed in the region next to the trunk lid or hatchback of the vehicle, or a portion thereof is provided on the trunk lid or on the hatchback and another portion is provided on the rear body part of the vehicle. In both cases, due to this configuration of the lighting arrangement the cross-sectional width of the loading opening that leads into the trunk or storage area is reduced. Thus, loading and unloading of the trunk becomes inconvenient and difficult. In addition, due to the reduced cross-sectional width of the loading opening, it is difficult, if not impossible, to load wide items into the trunk.

It is therefore an object of the present invention to improve a lighting arrangement of the aforementioned general type in such a way that the loading opening that leads into the trunk or storage area can be optimally utilized for loading the trunk or storage area, without thereby adversely affecting the safety function of the motor vehicle when the trunk lid or hatchback is opened.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The lighting arrangement of the present invention is characterized primarily in that at least one rear lighting arrangement is disposed on the trunk lid or hatchback, wherein the inventive lighting arrangement is embodied in such a way that light is radiated toward the rear when the trunk lid or hatchback is opened.

With the inventive lighting arrangement, the rear lighting arrangements are provided on the trunk lid or on the hatchback. If the trunk lid or hatchback is opened, the lighting arrangement is embodied in such a way that nevertheless light is radiated toward the rear, so that the parked motor vehicle can be reliably recognized. Since the rear lighting arrangements are provided on the trunk lid or on the hatchback, no additional installation space for the rear lighting arrangements is required in the rear body portion of the motor vehicle. For this reason, the loading opening that leads into the trunk or storage area of the motor vehicle has its maximum possible width. The trunk or storage area can therefore be easily loaded, even if the material that is to be loaded is very wide.

Further specific features of the present invention will be described in detail subsequently.

DESCRIPTION OF PREFERRED EMBODIMENTS

Figure 1:
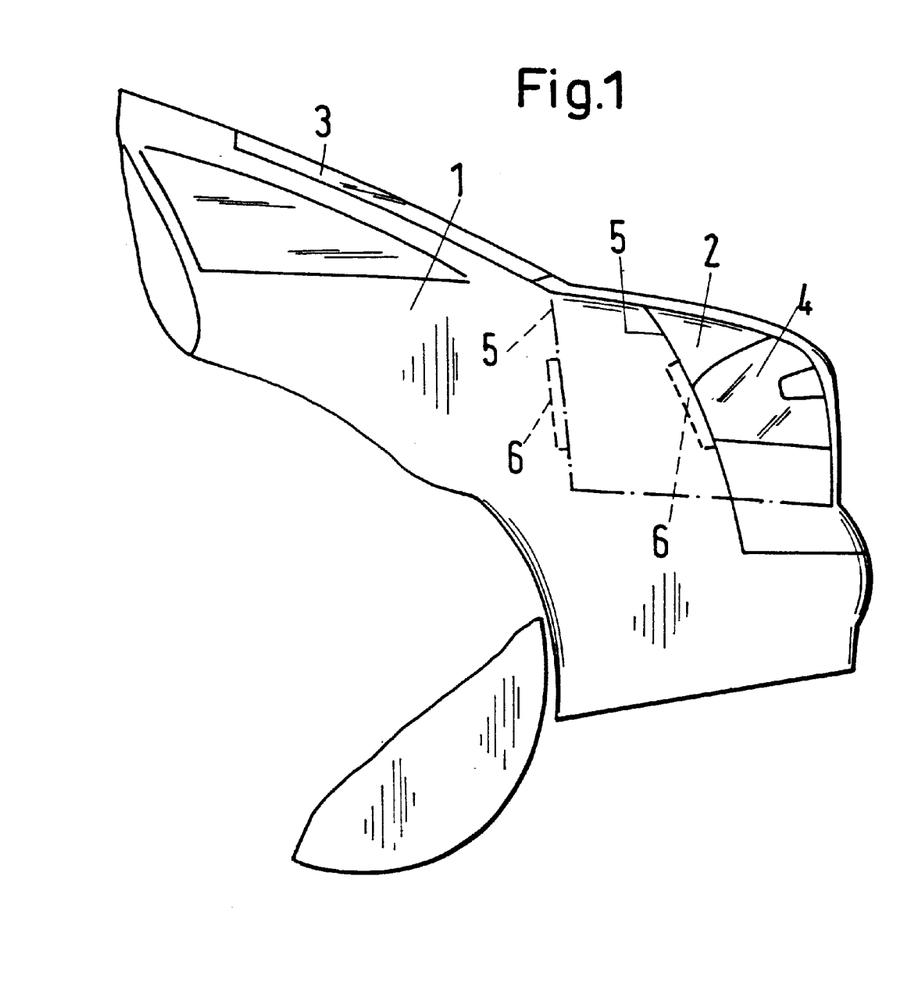
FIG. 1 illustrates the rear portion of a motor vehicle that is equipped with one exemplary embodiment of the inventive lighting arrangement.

Referring now to the drawings in detail, FIG. 1 shows the rear portion of a motor vehicle 1 with a trunk lid 2 in the closed position. A first embodiment of the configuration of the trunk lid 2 is illustrated by solid lines, and a second embodiment is illustrated by dot-dash lines. With the configuration indicated by dot-dash lines, the trunk lid 2 is extended on the sides very far in a direction toward the window 3. A rear lighting arrangement 4 is integrated into the trunk lid 2 and in a known manner contains a brake light, a blinker light, a tail light and a back-up light. Since the rear lighting arrangement 4 is integrated into the trunk lid 2, when the trunk lid is opened the rear lighting arrangement 4 is also moved upwardly. So that when the trunk lid 2 is opened the motor vehicle can still be recognized at night, a safety light 6, which includes at least a blinker light and a tail light, is provided at the opening rim 5 of the loading opening 11 (see FIG. 5) of the motor vehicle. Since this safety light 6 is provided at the rim of the loading opening of the motor vehicle, the entire rear lighting arrangement 4 can be integrated into the trunk lid 2. As a consequence, the entire width of the loading opening 11 of the motor vehicle that leads into the trunk is available for loading.

Such a safety light 6 is also provided on the opening rim 5 of the motor vehicle in the embodiment of the trunk lid 2 that is indicated by dot-dash lines. In contrast to the embodiment of the trunk lid illustrated in solid lines, this provides the possibility that the trunk of the motor vehicle is also accessible from the side.

Figure 2:
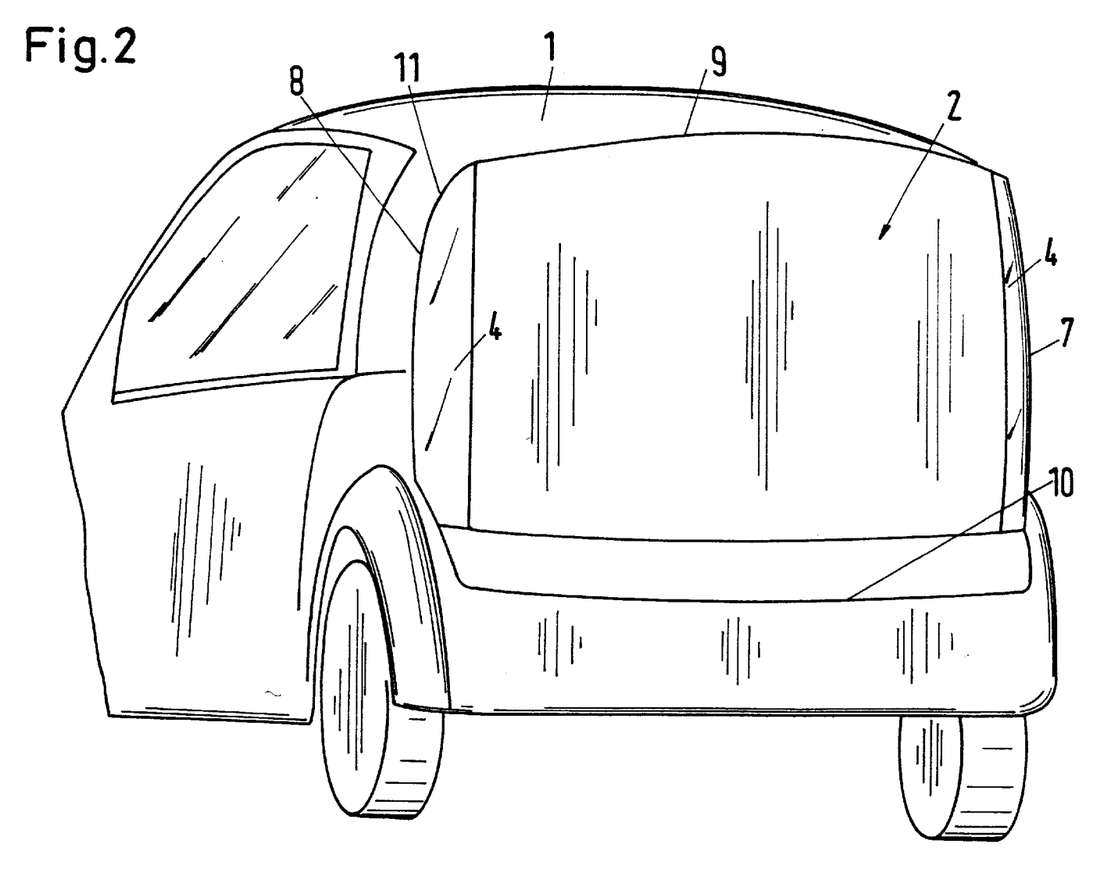
FIG. 2 is a simplified, perspective rear view of a motor vehicle equipped with one exemplary embodiment of the inventive lighting arrangement, with the hatchback being closed.
Figure 3:
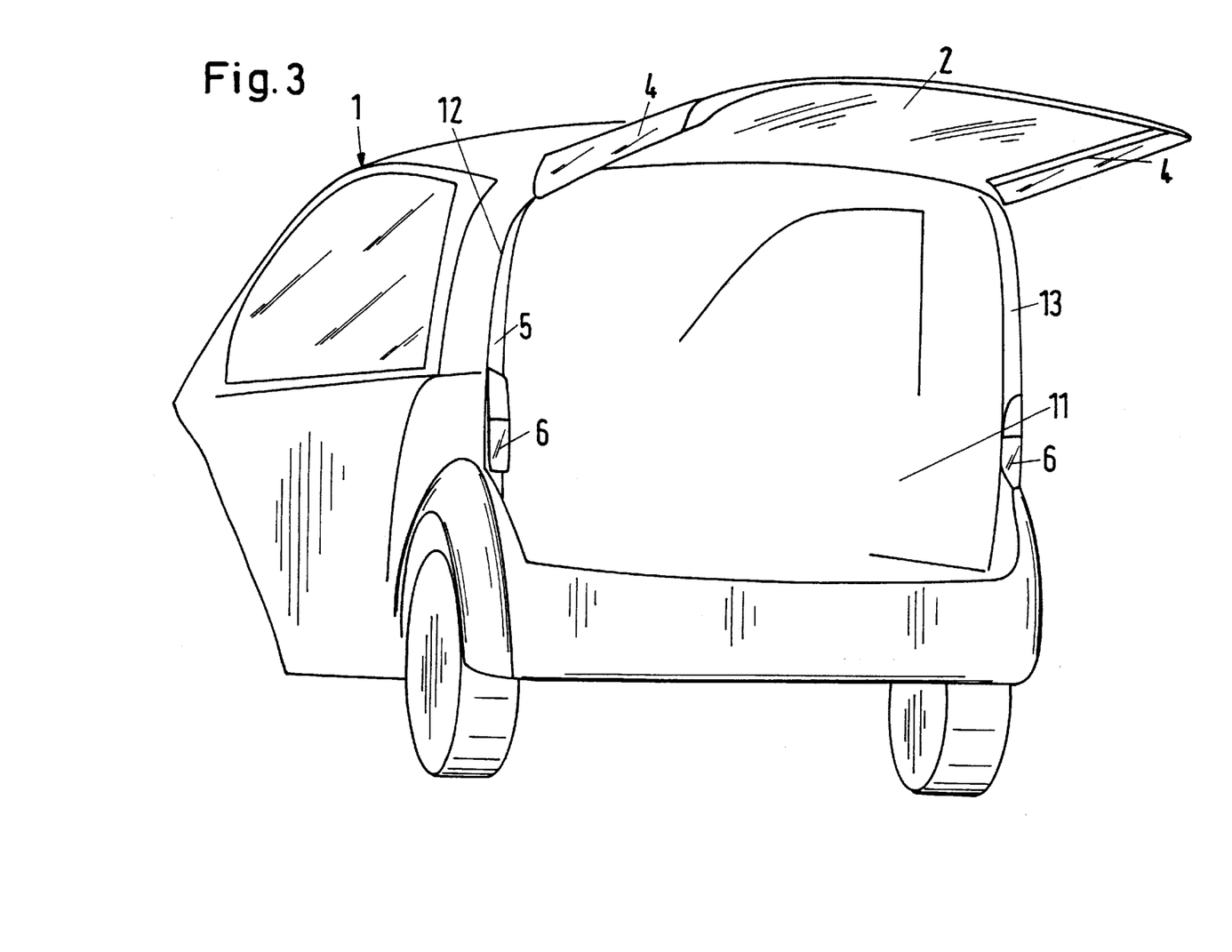
FIG. 3 shows the motor vehicle of FIG. 2 with the hatchback opened.

FIGS. 2 and 3 show a motor vehicle 1 that has a hatchback or rear lid 2 that is hinged to the upper edge of the motor vehicle and that extends downwardly relatively far. Provided on each of the longitudinal sides 7, 8 of the hatchback 2 is a respective rear lighting arrangement 4 that extends from the upper edge 9 of the hatchback 2 nearly to the lower edge 10 of the hatchback. The hatchback 2 closes off the loading opening 11 of the motor vehicle 1.

As can be seen from FIG. 3, to load the storage area the hatchback 2 is pivoted upwardly about the upper edge. Since the rear lighting arrangement 4 is integrated into the hatchback 2, it is taken along upwardly. Disposed on both of the longitudinal edges 12 and 13 on the opening rim 5 of the loading opening 11 are the safety lights 6, which are advantageously identically embodied and are each provided with a blinker light and a tail light. The width of these two safety lights 6 advantageously corresponds to the width of the longitudinal edges 12, 13 of the loading opening 11. Due to these safety lights 6, which are provided in addition to the rear lighting arrangements 4, the loading opening 11 can be provided over nearly the entire rear width of the motor vehicle 1. As a consequence, the loading opening 11 has a maximum opening cross section, so that the storage area of the motor vehicle 1 can be effortlessly loaded. If the hatchback 2 is again closed (see FIG. 2), the two safety lights 6 are no longer visible from the outside; rather, they are covered by the edges by the hatchback 2.

The hatchback 2 is advantageously largely comprised of glass or transparent polymeric material. It can, of course, also be made of any other suitable material.

Figure 4:
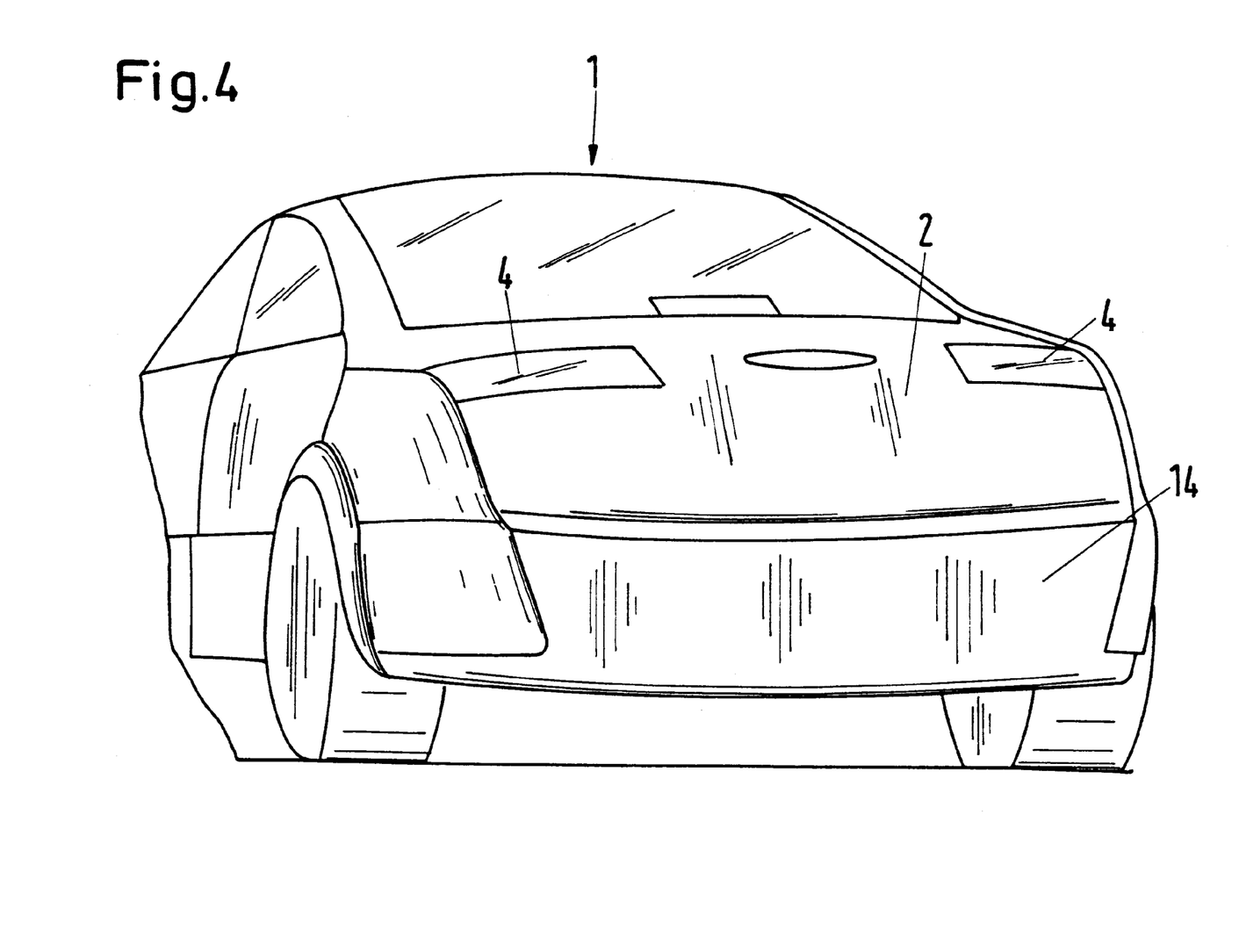
FIG. 4 is a perspective rear view of a motor vehicle equipped with another exemplary embodiment of the inventive lighting arrangement, with the trunk lid closed.
Figure 5:
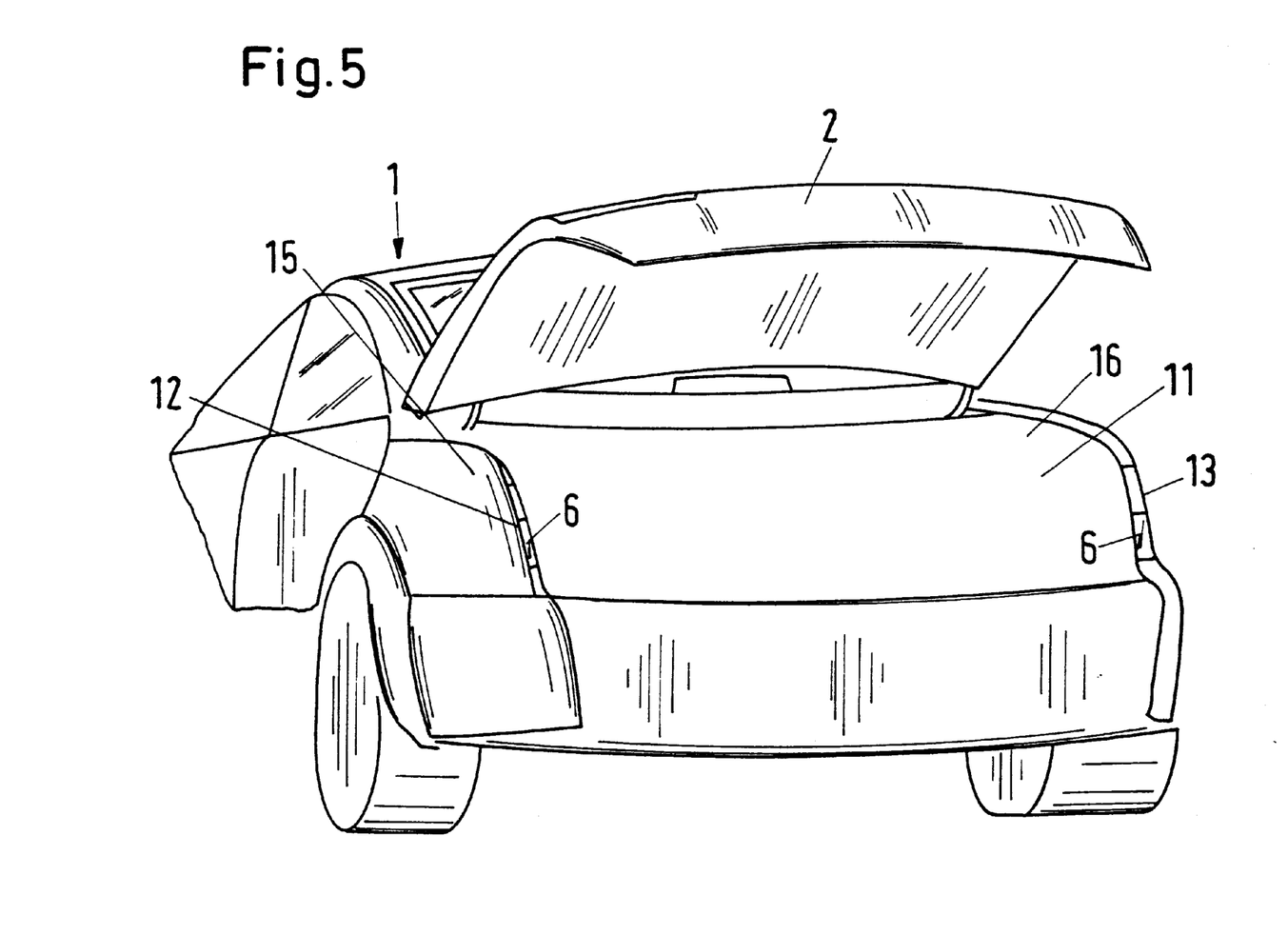
FIG. 5 shows the motor vehicle of FIG. 4 with the trunk lid opened.

The motor vehicle 1 of FIGS. 4 and 5 has a stepped rear end. The trunk lid 2 extends downwardly to about the level of the rear bumper 14. At the transition from the approximately horizontal portion to the downwardly extending portion of the trunk lid 2 the rear lighting arrangements are provided on both sides; the rear lighting arrangements are integrated into the trunk lid 2.

To open the trunk lid 2 of the trunk, it is pivoted upwardly (FIG. 5), whereby the two rear lighting arrangements 4 are carried along. With the trunk lid 2 pivoted upwardly, the safety lights 6 that are disposed on the longitudinal edges 12, 13 of the loading opening 11 are exposed. As is the case with the previous embodiments, the safety lights 6 radiate their light to the rear, so that people on the road can reliably recognize the parked motor vehicle 1 when the safety lights 6 are switched on. As can be seen from FIG. 5, the trunk lid 2 extends nearly over the entire width of the rear portion of the motor vehicle. As a result, the loading opening 11 has its maximum size. The loading opening 11 is delimited toward the sides by the rear side walls 15, 16 of the motor vehicle body. The width of the safety lights 6 corresponds to the width of the corresponding longitudinal edge 12, 13 of the loading opening 11. As with the previous embodiments, the safety lights 6 project neither laterally outwardly nor laterally inwardly beyond the opening edge 12, 13. Each of the safety lights 6 has a respective tail light and blinker light that in conformity with the previous embodiments are disposed one above the other.

Figure 6:
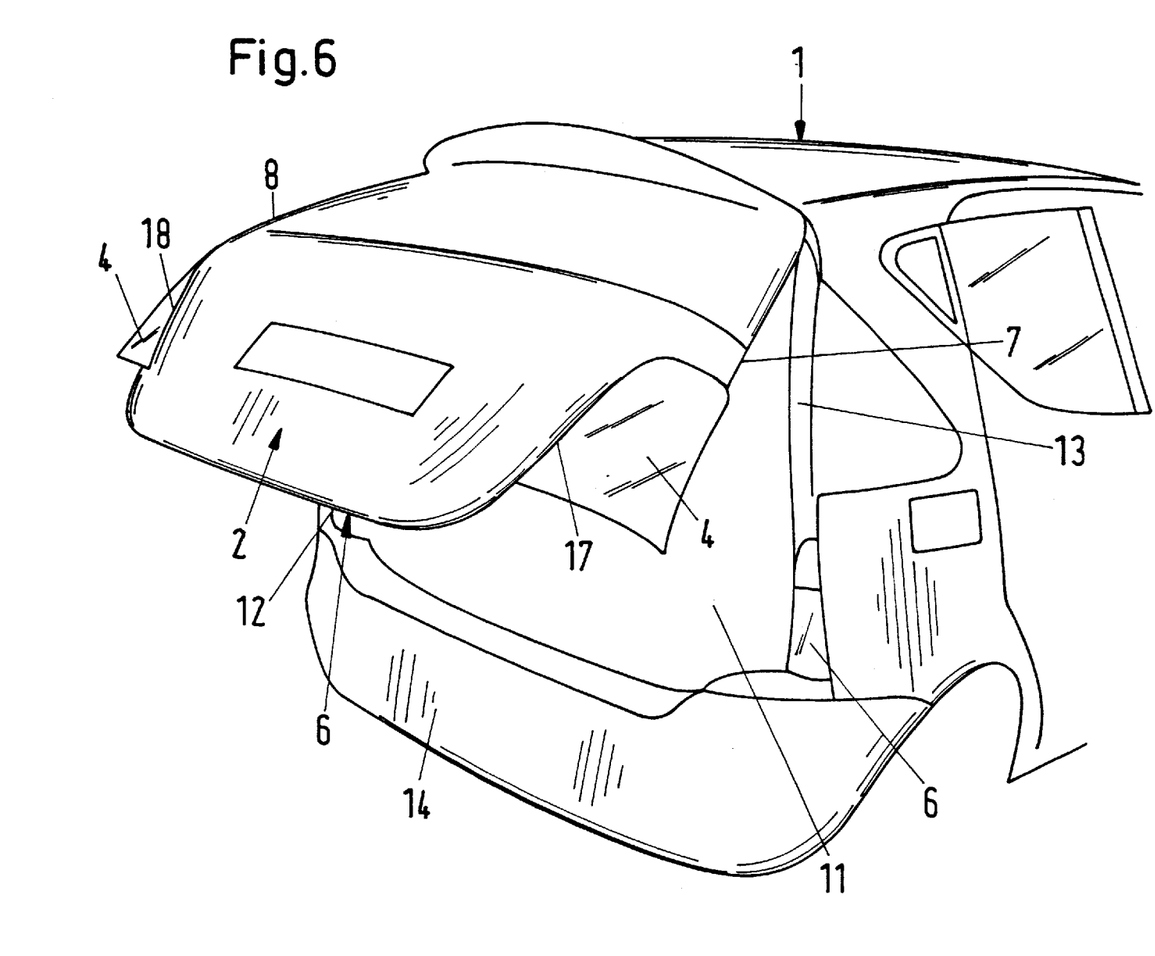
FIGS. 6–8 show motor vehicles equipped with further exemplary embodiments of the inventive lighting arrangement.

Whereas with the previous embodiment, the rear lighting arrangements 4 are disposed within the surface of the trunk lid 2, with the embodiment 6 the rear lighting arrangements 4 are connected to the side edges 7, 8 of the trunk lid 2. The side edges 7, 8 of the trunk lid 2 are accordingly provided with a side indentation 17,18 in which the rear lighting arrangements 4 are placed. The rear lighting arrangements are embodied in such a way that they form a nearly uniform extension of the trunk lid 2 in the region of the longitudinal side 7, 8 thereof. The central portion of the trunk lid 2 extends downwardly beyond the two rear lighting arrangements 4. Since the trunk lid 2 extends to the rear bumper 14, the trunk or storage space can be conveniently loaded.

If the trunk lid 2, which is embodied as a hatchback and has its upper edge hinged to the motor vehicle 1, is closed, the rear lighting arrangements 4 then overlap the safety lights 6, which are provided on the longitudinal edges 12, 13 of the loading opening 11 and extend upwardly from the bumper 14. As with the previous embodiments, the safety lights 6 do not extend laterally inwardly or outwardly beyond the longitudinal edges 12, 13. Due to the presence of the safety lights 6, the entire rear lighting arrangements 4 can be provided on the trunk lid 2 without endangering traffic safety.

Figure 7:
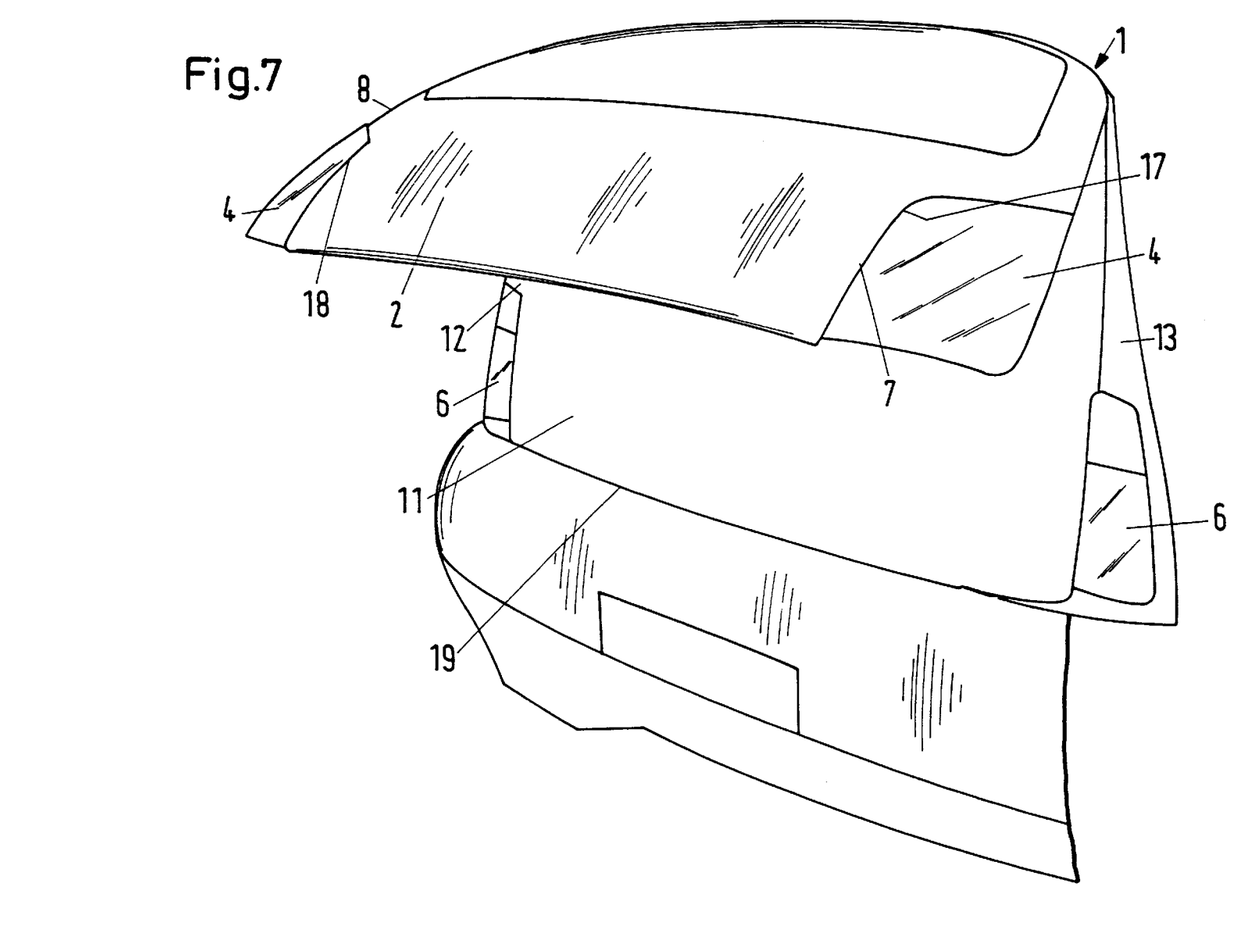

In the embodiment illustrated in FIG. 7, the trunk lid 2, which is again embodied as a hatchback, is provided on each of its longitudinal sides 7, 8 with a respective indentation 17, 18 into which a rear lighting arrangement 4 is placed. The rear lighting arrangements essentially form a uniform continuation of the trunk lid 2 in the region of the indentation 17, 18. The safety lights 6 are integrated into the two longitudinal edges 12, 13, which laterally delimit the loading opening 11. The safety lights 6 extend upwardly from the lower loading edge 19 of the trunk or storage area. If the trunk lid 2 is closed, the safety light 6 is covered by the rear lighting arrangements 4. Due to the presence of the safety lights 6, which radiate toward the rear, there is again ensured that when the trunk lid 2 is opened, the parked motor vehicle 1, with the safety lights switched on, can be recognized by other people that are on the road. Since the complete rear lighting arrangements 4 are part of the trunk lid 2, the loading opening 11 has a maximum width, so that the storage area can be conveniently loaded.

Figure 8:
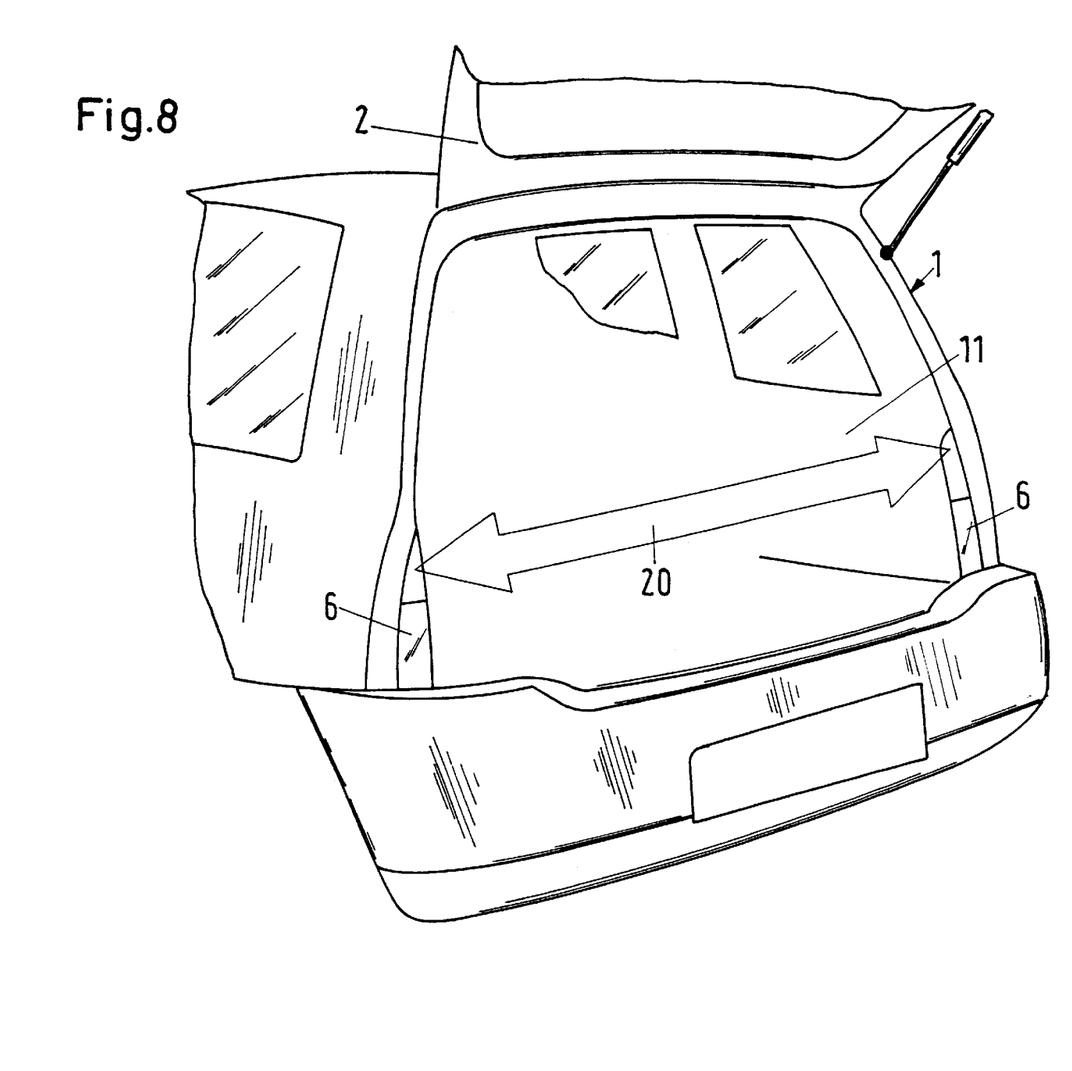

FIG. 8 schematically illustrates this maximum width 20 of the loading opening 11. Due to the safety lights 6, the rear lighting arrangements can be completely integrated in or provided on the trunk lid 2. The loading opening 11 thus extends between the two side portions of the motor vehicle 1. The loading opening 11 can consequently be optimally utilized for loading of the storage area.

Figure 9:
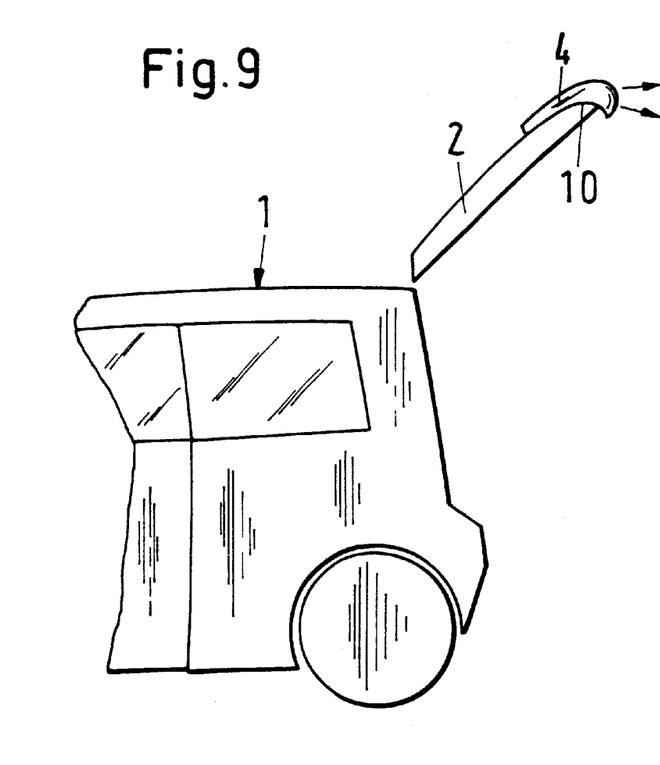
FIG. 9 is a side view of the rear portion of a motor vehicle that is provided with an inventive lighting arrangement, with the hatchback being opened.
Figure 10:
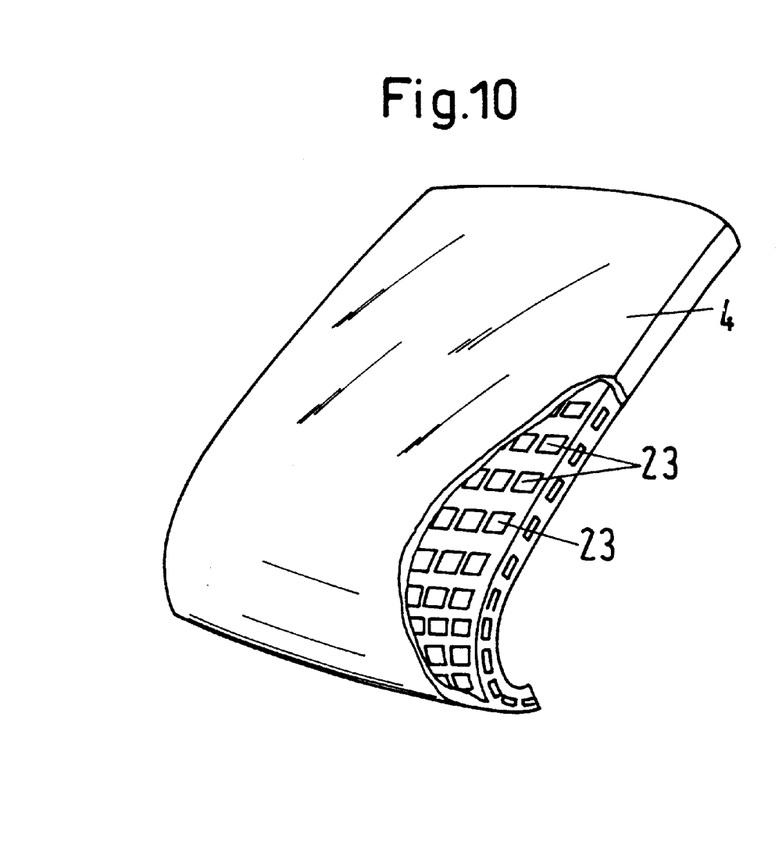
FIG. 10 is an enlarged view of the inventive lighting arrangement of FIG. 9.

FIGS. 9 and 10 illustrate an embodiment where the rear lighting arrangements 4 of the motor vehicle 1 are embodied in such a way that when the trunk lid 2 is opened the rear lighting arrangements can also perform a safety function. The trunk lid 2, which is embodied as a hatchback, is provided with the rear lighting arrangements 4 in the region of its lower edge 10. The rear lighting arrangements 4 are placed upon the trunk lid 2 and extend around the lower transverse edge 10 of the trunk lid 2. Accommodated within the rear lighting arrangements 4 are lighting means 23 that fulfill the appropriate lighting functions. These lighting means 23 can, for example, be LED's that are colored in conformity with the respective signal function. These lighting means 23 are provided up to the lower edge of the rear lighting arrangement 4. When viewed in plan, the rear lighting arrangement 4 has an approximately rectangular contour. As can be seen from the side view, the rear lighting arrangement 4 is bent in the lower region so as to have the shape of a partial circle, and it projects beyond the lower transverse edge 10 of the trunk lid 2. If the trunk lid 2 is opened (see FIG. 9.), the lighting means 23 that are disposed in the rear lighting arrangement 4 can radiate light toward the rear due to the presence of the lighting means that extend beyond the transverse edge 10 and also partially surround the edge 10. Thus, the rear lighting arrangements 4 also perform a safety function when the trunk lid 2 is opened, since as a consequence of the light that is being radiated toward the rear a parked vehicle can satisfactorily be recognized by other people on the road. Since the rear lighting arrangement 4 is entirely provided on the trunk lid 2, the loading opening again has a maximum width that is not limited in any way by portions of the rear lighting arrangement.

The specification incorporates by reference the disclosure of priority document DE 299 03 080.6 of Feb. 22, 1999.

The present invention is, of course, in no way restricted to the specific disclosure of the specification and drawings, but also encompasses any modifications within the scope of the appended claims.

What we claim is:

1. A lighting arrangement for a motor vehicle having a trunk lid or hatchback, comprising:

at least one rear lighting arrangement that is disposed on said trunk lid or hatchback, wherein said lighting arrangement is embodied such that light is radiated in a rearward direction relative to said vehicle when said trunk lid or hatchback is in an open position, and wherein at least one safety light is provided that is covered when said trunk lid or said hatchback is closed.

2. A lighting arrangement according to claim 1, wherein said at least one safety light is provided on an edge that is provided on the body of the vehicle and partially defines a loading opening that leads into a trunk or storage area of the vehicle.

3. A lighting arrangement according to claim 2, wherein said at least one safety light is provided on vertical ones of said edges of said loading opening.

4. A lighting arrangement according to claim 3, wherein a respective one of said safety lights is provided on each of two vertical ones of said edges of said loading opening.

5. A lighting arrangement according to claim 1, wherein said at least one safety light includes at least one tail light.

6. A lighting arrangement according to claim 1, wherein said at least one safety light is provided with at least one blinker light.

7. A lighting arrangement according to claim 6, wherein said at least one safety light includes at least one brake light, and wherein said at least one tail light and said at least one brake light are disposed one above the other.

8. A lighting arrangement according to claim 1, wherein said at least one safety light is covered when said trunk lid or hatchback is in a closed position.

9. A lighting arrangement according to claim 1, wherein said at least one safety light is covered by said at least one rear lighting arrangement when said trunk lid or hatchback is in a closed position.

10. A lighting arrangement according to claim 1, wherein said at least one rear lighting arrangement is integrated into said trunk lid or hatchback.

11. A lighting arrangement according to claim 10, wherein said trunk lid or hatchback is made of polymeric material into which said at least one rear lighting arrangement is integrated.

12. A light arrangement according to claim 1, wherein said at least one rear light arrangement at least partially extends around a lower transverse edge of said trunk lid or hatchback.

13. A lighting arrangement according to claim 12, wherein a lower portion of said at least one light arrangement extends approximately at a right angle.

14. A lighting arrangement according to claim 12, wherein lighting means are distributed over a surface of said at least one rear lighting arrangement.

15. A lighting arrangement according to claim 14, wherein said lighting means are LED's.

16. A lighting arrangement for a motor vehicle having a trunk lid or hatchback, comprising:

at least one rear lighting arrangement that is disposed on said trunk lid or hatchback, wherein said lighting arrangement is embodied such that light is radiated in a rearward direction relative to said vehicle when said trunk lid or hatchback is in an open position, wherein said trunk lid or hatchback is provided with vertical longitudinal edges that are each provided with a lateral indentation, and wherein a respective rear lighting arrangement is disposed in each of said indentations.

* * * * *